Jan. 4, 1927.

J. J. CHAMBERLAIN 1,613,500

MOLDING PRESS

Filed April 23, 1926    4 Sheets-Sheet 2

INVENTOR.
JOHN J. CHAMBERLAIN.
BY
ATTORNEY.

Jan. 4, 1927. 1,613,500
J. J. CHAMBERLAIN
MOLDING PRESS
Filed April 23, 1926 4 Sheets-Sheet 3
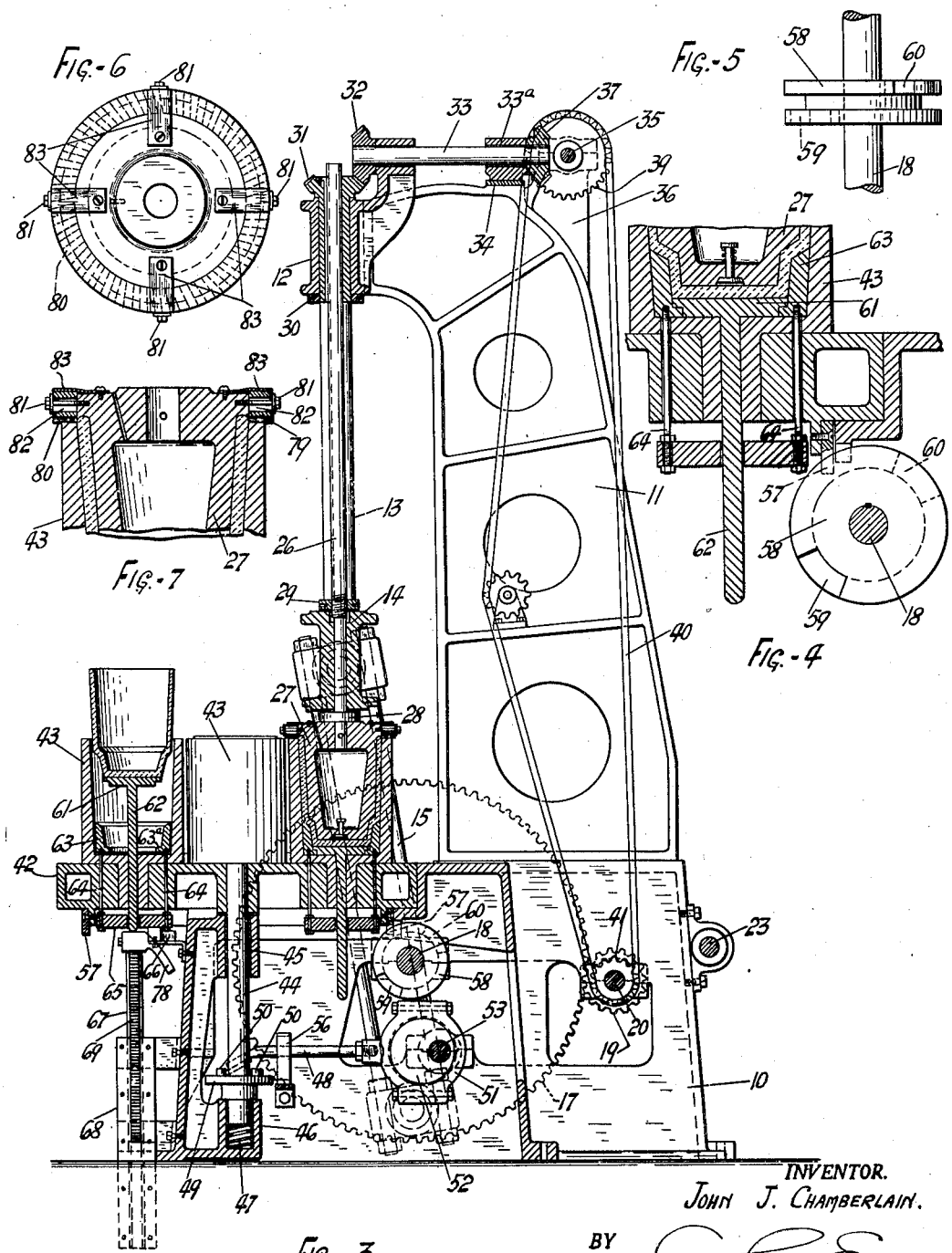
INVENTOR.
JOHN J. CHAMBERLAIN.
BY
ATTORNEY.

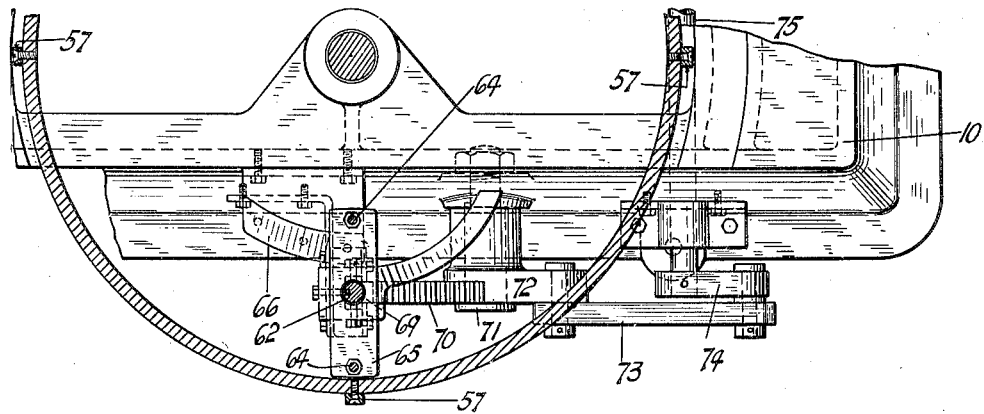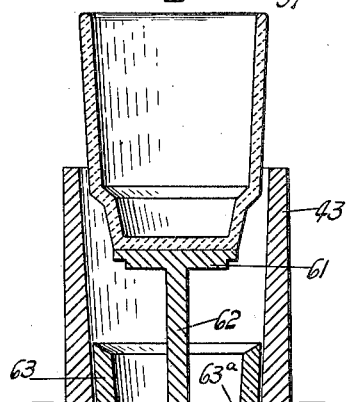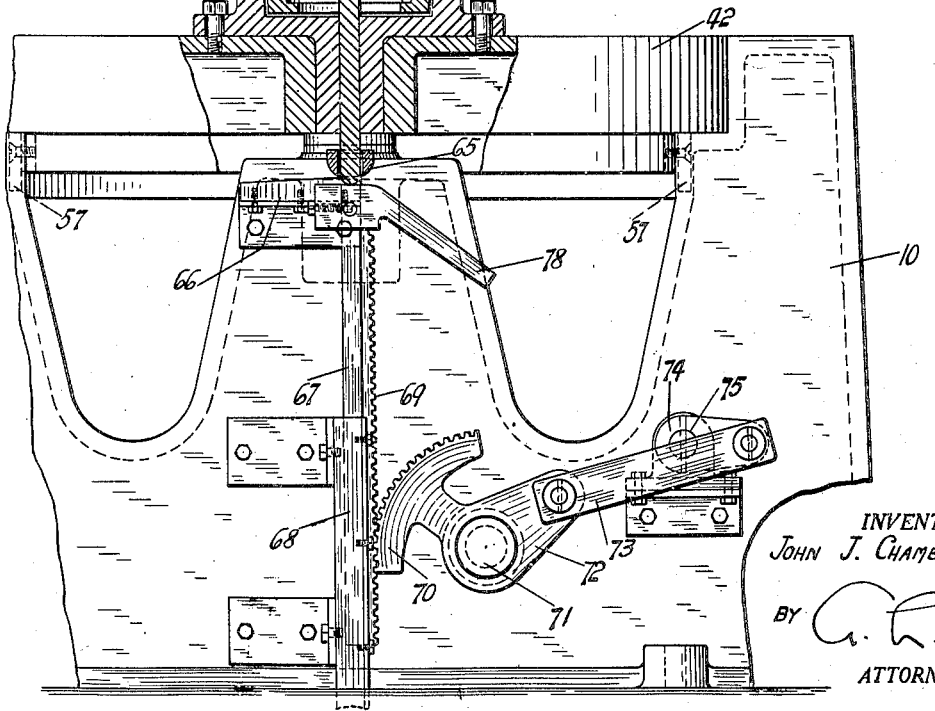

Patented Jan. 4, 1927.

1,613,500

UNITED STATES PATENT OFFICE.

JOHN J. CHAMBERLAIN, OF AKRON, OHIO, ASSIGNOR TO THE UNITED STATES STONEWARE COMPANY, OF AKRON, OHIO, A CORPORATION OF OHIO.

MOLDING PRESS.

Application filed April 23, 1926. Serial No. 104,100.

This invention relates to molding presses such as are used for molding earthenware articles.

The chief object of the invention is to provide an improved press of that type including an intermittently actuated table carrying a plurality of molds and adapted to position the molds in succession in timed relation beneath a continuously reciprocating molding plunger or die.

A particular object of the invention is to provide an improved means for locking the table in proper position for a pressing operation on each die between the intermittent movements of the table.

Another object is to provide means for trimming the flash from the molded object.

Another object is to provide improved means for effectively ejecting the finished articles from the molds with minimum breakage.

The foregoing and other objects are obtained by the construction illustrated in the accompanying drawings and described below. It is to be understood that the invention is not limited to the particular form thereof shown and described.

Of the accompanying drawings,

Figure 3 is a section on line 3—3 of Figure 2;

Figure 4 is an enlarged detail of the table-locking device as shown in Figure 3;

Figure 5 is a detail plan of the table-locking cam;

Figure 6 is a detail plan of the trimming device;

Figure 7 is a sectional detail thereof;

Figure 8 is an enlarged plan of the ejecting devices; and

Figure 9 is an enlarged front elevation, partly in section, thereof.

Figure 1:
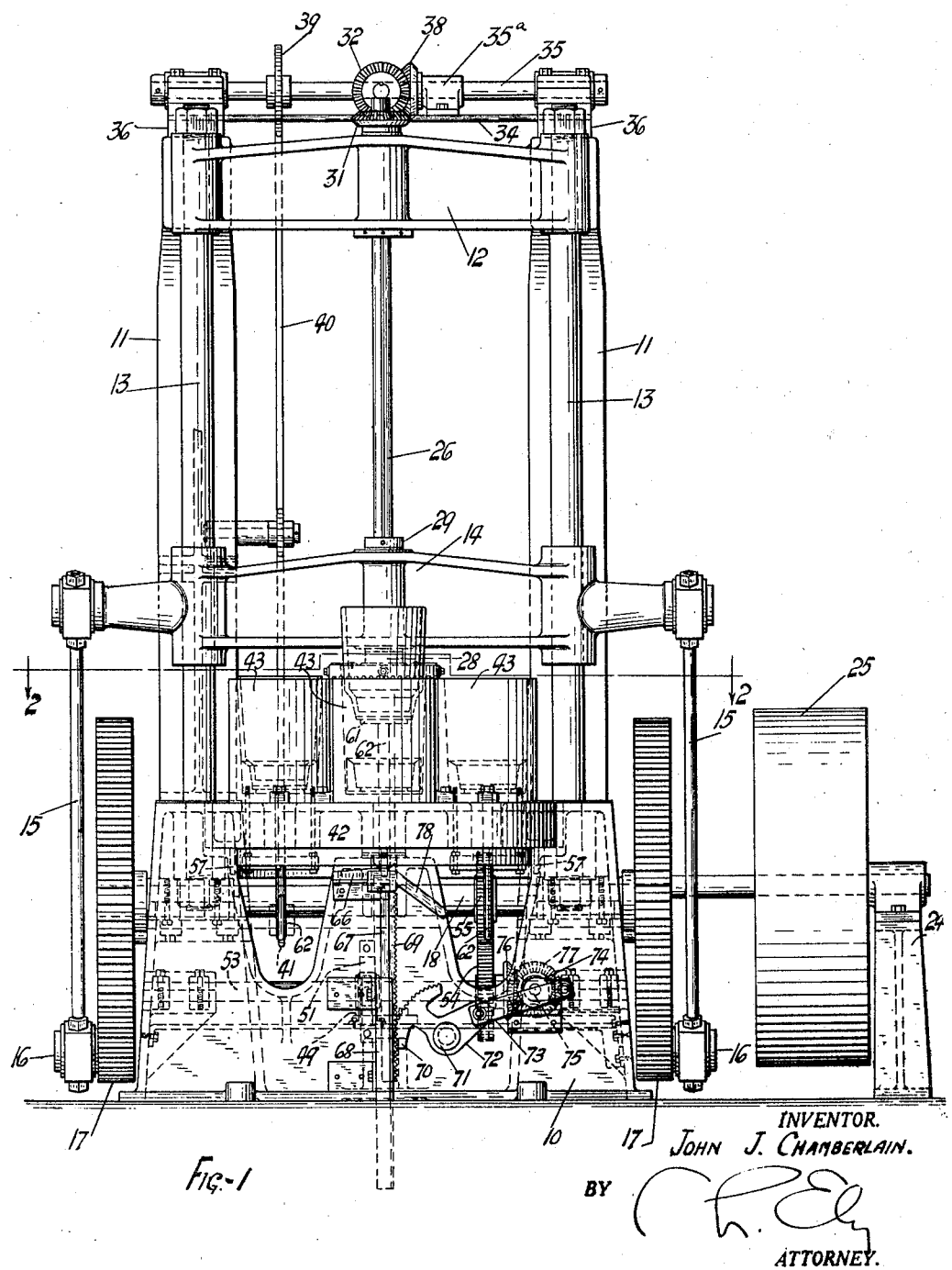
Figure 1 is a front elevation of a press embodying the invention.
Figure 2:
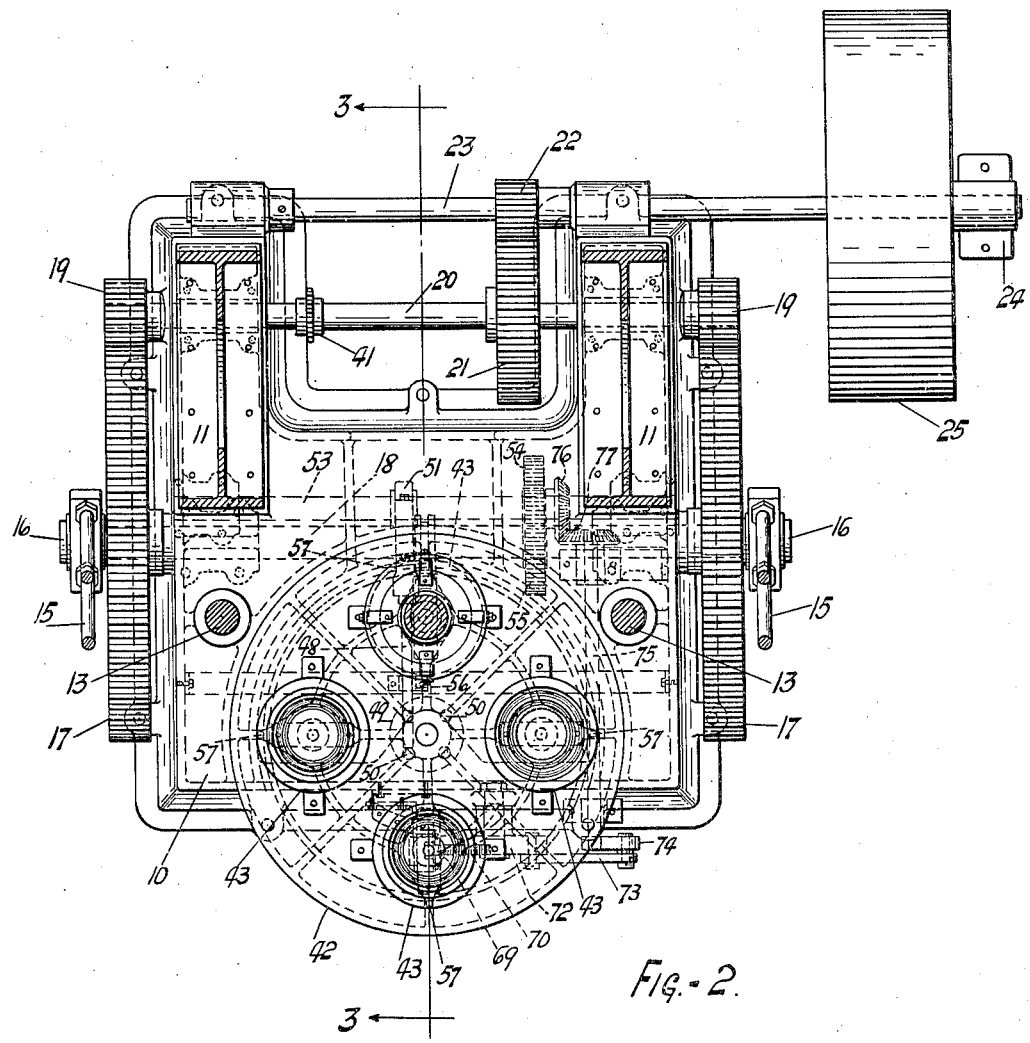
Figure 2 is a sectional plan thereof on line 2—2 of Figure 1.

Referring to the drawings, 10 represents a supporting casting on which are secured, at the rear corners thereof, standards 11, 11 extending forwardly at their upper ends into overhanging relation to the top of casting 10 and connected at said upper ends by a crosspiece 12. Vertical rods 13, 13 are bolted into the crosspiece 12 at the opposite ends thereof and also into casting 10 to provide slides for a crosshead 14 adapted to be reciprocated on said rods by pitmen 15, 15 connected to crank pins 16, 16 on gears 17, 17 secured on a shaft 18 journaled in casting 10 and adapted to be driven in any suitable way. The preferred form of driving mechanism comprises pinions 19, 19 on a shaft 20 journaled in casting 10 and having a gear 21 thereon meshed with a pinion 22 on a shaft 23 journaled in casting 10 and a bracket 24, shaft 23 being driven by a pulley 25.

The press herein shown is adapted for molding earthenware pottery. Accordingly, crosshead 14 has journaled therein a shaft 26 carrying a rotary die 27 on its lower end and held against vertical play in crosshead 14 by means of a fixed collar 28 and an adjustable collar 29. Shaft 26 is adapted to be rotated by means of a sleeve 30 journaled in crosspiece 12 and keyed or feathered to shaft 26 so as to permit vertical reciprocation of shaft 13 while it is rotating. Sleeve 30 has a bevel gear 31 on its upper end which is meshed with a bevel gear 32 on a rearwardly extending jack shaft 33 journaled in crosspiece 12 and a bracket 33ª supported on a crossbar 34 on standards 13. Jack shaft 33 is driven by a cross shaft 35, journaled in brackets 36, 36 on standards 11 and in a bracket 35ª on crossbar 34, through a bevel gear 37 on shaft 33 meshed with a bevel gear 38 on shaft 35. Shaft 35 is driven by a sprocket 39 over which is trained a drive chain 40, driven by a sprocket 41 on shaft 20.

The rotary mold carrying table is shown at 42 carrying a circumferential series of molds 43, 43 secured thereon in any suitable way. Table 42 is mounted on a vertical shaft 44 journaled in the supporting casting 10 in an upper bearing 45 and a lower bearing 46 in which latter it is preferably supported from beneath by a spring 47 for taking considerable of the load off bearings 45 and 46. Table 42 is arranged to be intermittently actuated to position the molds 43 in succession beneath the reciprocating die 27 by means of a pawl 48 riding on a flange 49 on shaft 44 and adapted to engage a circumferential series of studs 50, 50 on the upper surface of said flange. Pawl 48 is connected to an eccentric strap 51 on an eccentric 52 on shaft 53 journaled in casting 10 adjacent the bottom thereof and driven by a gear 54 meshed with a gear 55 on shaft 18. A guide 56 is mounted on casting 10 to hold pawl 48 in proper alignment during its reciprocatory movements.

Provision is made for locking the table in position during a molding operation. Table 42 has studs 57, 57 thereon arranged to be engaged at the molding position by a cam 58 on shaft 18. Cam 58 comprises a peripherally grooved disc having an opening 59 in one side thereof through which a stud 57 may pass into the peripheral groove as the table approaches a position with a mold 43 beneath die 27, and a diametrically opposite opening 60 on the other side thereof out of which the stud may pass as the table begins its rotary movement to place another mold in position. Thus the mold table is locked during half a revolution of shaft 18 or during the movement of die 27 from a point intermediate the length of its stroke downwardly and back to said point and while pawl 48 is idling on flange 49.

The flash trimming device of the invention comprises an annular cutter 79 mounted for shifting movement on die 27 so as to engage on the top of a mold as the die is pressed therein, the ring 79 preferably being formed with angular grooves 80, 80 on its under surface providing sharp trimming edges. The ring 79 may be shiftably mounted on bolts 81, 81 engaged through vertically elongated slots 82, 82 therein and may be normally retained flush with the upper surface of die 27 by leaf spring 83, 83 secured thereon, but adapted to be urged relatively upwardly from this position by pressure against the upper edge of a mold 43 so that when the die 27 is elevated out of the mold 43 there will be a slight lag in the movement of the trimmer away from the upper edge of the mold, during which lag it rotates with the die and effectively trims any flash from the molded article.

The improved article ejecting mechanism includes two relatively movable bottom plates in each mold. The main ejector plate comprises a central platen 61 mounted on a vertically shiftable stud 62 extending through the table and projecting below the same. The auxiliary ejector plate comprises a ring 63 for forming a peripheral marginal portion of the bottom of the molded article, the ring 63 having a shoulder 63ª for engaging under disc 61, and mounted on spaced vertically shiftable rods 64, 64 projecting through and beneath table 10 and mounted on a crosspiece 65 formed with a rounded under surface as shown in Figure 9, the parts being arranged to permit limited vertical shifting of ring 63 to impart a preliminary loosening action on the molded object before the actual ejection. For shifting ring 63, a fixed cam plate 66 is mounted on casting 10 so as to be in the path of crosspieces 65 as they approach the ejecting station which preferably is at that position opposite the molding station, cam plate 66 being shaped to engage the under surface of the crosspiece 65 and lift the same slightly.

At the ejecting station there is provided a vertically reciprocating ejector rod 67 slidable in a guide 68 on casting 10 and being formed with a rack 69, with which meshes a segmental gear 70, journaled on a shaft 71 and having an arm 72 thereon connected by a pitman 73 to a crank 74 and driven by shaft 53 through bevel gears 76 and 77 respectively on shaft 53 and shaft 75. The upper end of ejector rod 67 has a sloping, arc-shaped cam 78 thereon to provide for a gradual lowering of platen 61 as a mold 43 moves away from the ejecting station.

The operation of the press will be understood from the foregoing description. The die and ejector are continuously reciprocated while the table is intermittently rotated to position the molds for molding and ejecting operations. During movement of the die over the lower half of its stroke and the movement of the ejector over the upper half of its stroke, pawl 48 is idling and cam 58 is holding the table in position. The bat of clay or other material to be molded is thrown into each empty mold at the right in Figure 1. The material is then molded at the molding station, cutter 79 neatly trimming the flash as will be understood. The molded article is given a preliminary loosening movement by cam 66 as it approaches the ejecting station. Finally the article is ejected from the mold at the ejecting station and is lifted from the platen 61 by an operator.

Modifications of the invention may be resorted to without departing from the spirit thereof or the scope of the appended claims.

What is claimed is:

1. A mold press comprising a mold, a reciprocable die, means for rotating said die, and an annular cutter carried by the die and adapted to engage the edge of the mold, said cutter being so mounted as to lag in its upward movement with the plunger so as to trim the flash off the molded article.

2. A mold press comprising, in combination, an intermittently rotatable table carrying a series of molds, a continuously reciprocable die, and means for locking said table with a mold beneath the die, said means comprising a cam rotating continuously in timed relation to the reciprocation of said die and having a groove in its outer periphery and formed with diametrically opposite openings leading into the groove on one side of the cam and out of the groove on the other side of the cam, and studs on said table adapted to pass through one opening into the peripheral groove and out of the other opening.

3. A mold press having, in combination, an intermittently rotatable table carrying a series of molds, a continuously driven means for rotating said table, and a reciprocating ejector mechanism driven by said means, said ejector mechanism comprising a rack, a segmental gear, an arm connected to said gear for oscillating the same to reciprocate the rack, a pitman connected to the arm, and a crank connected to the pitman, said crank being driven by said continuously driven means.

4. A mold press having, in combination, an intermittently actuated table carrying a series of molds, ejector platens in the molds and a continuously reciprocating ejector for elevating the platens in the molds, said ejector having a sloping cam member thereon providing for a gradual lowering of said platens as the molds are carried away from the ejector.

5. A mold press for making hollow articles having, in combination, an intermittently rotatable table carrying a series of molds, platens in the molds, studs supporting the platens and extending through and projecting below the table, a reciprocating ejector adapted to engage the studs at one position to elevate the platens in the molds, and means for slightly elevating said platens prior to the actuation thereof by said ejector, said means comprising members engaged under the perimeters of the molded articles and having shoulders thereon on which said platens rest, said members being supported on elements projecting through and below the table, and a fixed cam arranged in the path of said elements in advance of said position.

6. A mold press for making hollow articles having, in combination, an intermittently rotatable table carrying a series of molds, platens in the molds, studs supporting the platens and extending through and projecting below the table, a reciprocating ejector adapted to engage the studs at one position, and means to elevate the platens prior to the actuation thereof by said ejector.

JOHN J. CHAMBERLAIN.